US011036852B2

(12) United States Patent
Lau et al.

(10) Patent No.: US 11,036,852 B2
(45) Date of Patent: Jun. 15, 2021

(54) SYSTEM AND METHOD FOR SOFTWARE DIVERSIFICATION

(71) Applicant: LGS Innovations LLC, Herndon, VA (US)

(72) Inventors: David Lau, Elmhurst, IL (US); Greg St. Louis, Geneva, IL (US); Dan Wojciechowski, Aurora, IL (US); Gerald Thompson, Somerset, NJ (US)

(*) Notice: Subject to any disclaimer, the term of this patent is extended or adjusted under 35 U.S.C. 154(b) by 293 days.

(21) Appl. No.: 16/353,502

(22) Filed: Mar. 14, 2019

(65) Prior Publication Data
US 2020/0293650 A1    Sep. 17, 2020

(51) Int. Cl.
| G06F 21/00 | (2013.01) |
| G06F 21/54 | (2013.01) |
| G06F 21/57 | (2013.01) |
| G06F 21/12 | (2013.01) |

(52) U.S. Cl.
CPC ............ *G06F 21/54* (2013.01); *G06F 21/126* (2013.01); *G06F 21/572* (2013.01); *G06F 21/575* (2013.01)

(58) Field of Classification Search
CPC ...... G06F 21/54; G06F 21/572; G06F 21/126; G06F 21/575; G06F 21/79; G06F 21/52
See application file for complete search history.

(56) References Cited

U.S. PATENT DOCUMENTS

| 2013/0205388 A1* | 8/2013 | Hunt ...................... G06F 8/447 726/22 |
| 2015/0379263 A1* | 12/2015 | Vipat ..................... G06F 21/62 726/23 |
| 2017/0357593 A1* | 12/2017 | Lau ...................... G06F 21/6281 |
| 2018/0082056 A1* | 3/2018 | Farchi .................... G06F 21/54 |

FOREIGN PATENT DOCUMENTS

| CN | 105022956 A | * | 11/2015 |
| CN | 105224864 A | * | 1/2016 |
| WO | WO-2014152469 A1 | * | 9/2014 | ........... G06F 21/566 |

\* cited by examiner

*Primary Examiner* — John B King
(74) *Attorney, Agent, or Firm* — BakerHostetler (57) ABSTRACT

The present disclosure pertains to a system configured to prepare and use prediction models for software diversification. Some embodiments may: obtain compilation data; identify a plurality of blocks from the compilation data; and pad each of one or more blocks of the plurality of blocks by a random amount such that executable instructions within the each block begin at a different location to prevent a deterministic memory addressing attack, none of the one or more blocks being a beginning block of the compilation data.

19 Claims, 8 Drawing Sheets

SYSTEM AND METHOD FOR SOFTWARE DIVERSIFICATION

TECHNICAL FIELD

The present disclosure relates to computing devices and cyber-security and, particularly, to systems and methods for securing a computing device via software diversification.

BACKGROUND

Networked computing devices face increasing levels of threats and exploitation all over the world. Conventional computing devices used in networks (e.g., the Internet) support different kinds of software code to implement different networking functionalities. Hackers may infiltrate die network and exploit vulnerabilities in software code. The manufacturer of such code often does not know about the vulnerabilities, or if known, is unable to fix such vulnerabilities in time.

Compiled binary images of software programs are susceptible to exploits, e.g., via such vulnerabilities as deterministic memory addressing (i.e., where the same code deterministically resides at the same location in memories of different devices). Once the necessary locations are known, an attacker can exploit any target, e.g., a computing device that runs the same software. As such, an attacker may have an in-depth understanding of the internal details of a victim program, including the locations of critical data and/or code.

One known technique for securing device software is to randomize a starting address of an executable binary (e.g., via address space layout randomization (ASLR)). ASLR hinders some types of security attacks by making it more difficult for an attacker to predict target addresses. One drawback of an ASLR implementation is that it requires support from either Linux operating systems (OSs), Apple iOS (since version 4.3), Microsoft Windows (since Windows Vista), or Android (since version 4.0)). This form of randomization requires OS support, in the target hardware device (e.g., via at least certain, minimal resources and/or utilities) and in the software code itself. This is especially problematic in view of future growth in the Internet of things (IoT), e.g., with respect to many different types of reduced capability devices (e.g., smart speakers, smart appliances, etc.). As such, not all software code and not all OSs can support randomization of starting addresses. Even when supported, such randomization merely moves the entire compiled binary randomly from a first starting address in memory to a different, second starting address. However, if an attacker was to obtain the second starting address of the compiled binary in memory on a target, then the whole address space layout is available to the hacker, resulting in compromised security. For example, the attacker can easily modify the exploit to function against the running copy of the compiled binary on that target. Precise knowledge of the target software provides the underpinning, for a wide range of attacks.

Other limited techniques for securing device software (e.g., via object file reordering) are disclosed in U.S. Pat. No. 10,089,494, which is incorporated by reference herein in its entirety. Accordingly, various aspects of this disclosure are directed towards addressing these risks and drawbacks.

SUMMARY

Systems and methods are disclosed to protect compiled software code against vulnerabilities that rely on deterministic memory addressing by shifting at least some those addresses. To prevent the deterministic memory addressing exploit from working, software instructions identified and used in the exploit are not to be found at the expected memory locations in the target of the attack by introducing entropy to that address space. In other words, if the software (e.g., compiled binary) in the target of the attack is not in the same place as when the attack was crafted, the attack fails. Having the same software instructions at different locations in different targets is referred to herein as software diversification.

Accordingly, one or more aspects of the present disclosure relate to a method for diversifying software by: obtaining compilation data; identifying a plurality of blocks from the compilation data; and padding each of one or more blocks of the plurality of blocks by a random amount such that executable instructions within the each block begin at a different location to prevent a deterministic memory addressing attack, none of the one or more blocks being a beginning block of the compilation data. The method is implemented by one or more hardware processors configured by machine-readable instructions and/or other components.

Yet another aspect of the present disclosure relates to a system configured for diversifying software. The system comprises one or more processors, media (e.g., a non-transitory, computer-readable medium), and/or other components with respect to which machine-readable instructions may be executed to diversify software using the mentioned method. Implementations of any of the described techniques may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Other features will be apparent from the following description, including the drawings and claims. The drawings, though, are for the purposes of illustration and description only and are not intended as a definition of the limits of the disclosure.

DETAILED DESCRIPTION OF EXEMPLARY EMBODIMENTS

As used throughout this application, the word "may" is used in a permissive sense (i.e., meaning having, the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Directional phrases used herein, such as, for example and without limitation, top, bottom, left, right, upper, lower, from, back, and derivatives thereof, relate to the orientation of the elements shown in the drawings and are not limiting upon the claims unless expressly recited therein.

Figure 1:
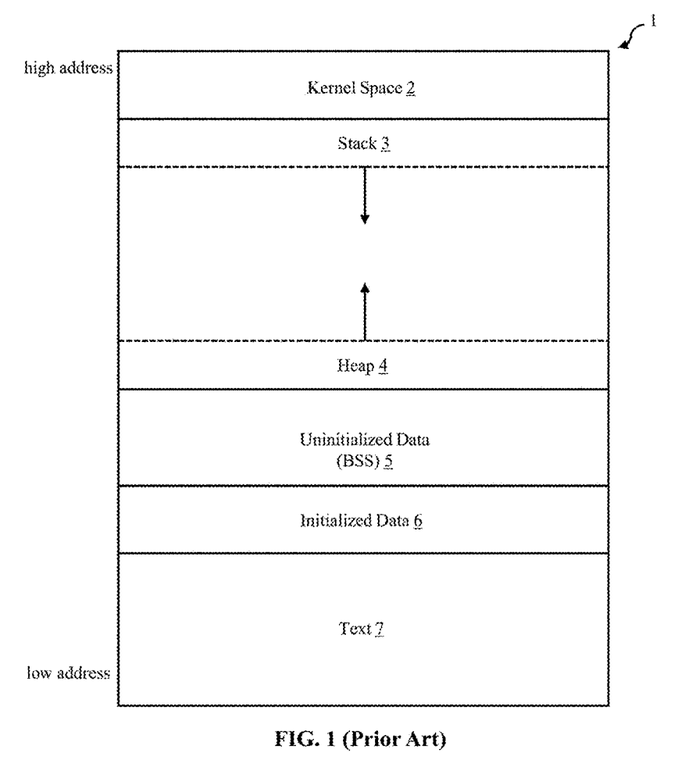
FIG. 1 illustrates a memory layout of a running software process or program, as is known in the art.

Presently disclosed are systems and methods for securing or protecting a program memory layout of a networked computing device. FIG. 1 illustrates conventional memory layout 1 of a running software process or, program. Layout 1 may pertain to random access memory (RAM) of a program and/or to a portion of virtual address space of the program, and this layout may comprise kernel space 2, stack 3, heap 4, uninitialized data (BSS) segment 5, initialized data segment 6, and text segment 7.

An operating system's (OS's) kernel space 2 of FIG. 1 may be a region of memory addresses (e.g., size of 1 GB) from which user code cannot read and to which the user code cannot write, i.e., to prevent a segmentation fault.

Stark area 3 of FIG. 1 may comprise a program stack, e.g., a last in first out (LIFO) structure typically located in the higher memory addresses right below OS kernel space 2. Stack area 3 may dynamically grow downwards (and shrink upwards). Stack area 3 may be devoted to store all the data needed by a function call in a program. Stack segment 3 may be temporary storage. In heap area 4 of FIG. 1, dynamic memory allocation may take place, i.e., to allocate memory requested by a programmer for variables whose size can be only known at run-time and cannot be statically determined by the compiler before program execution. Heap area 4 may dynamically grow upwards (and shrink downwards). Heap area 4 may be shared by all shared libraries, and dynamically loaded modules in a process. Heap 4 may store the dynamically allocated memory during run time. The memory space between stack 3 and heap 4 may be a raw memory mapping segment comprising, e.g., file mappings (including dynamic libraries) and anonymous mappings.

Block-started-by-symbol (BSS) segment 5 of FIG. 1, which is also referred to as uninitialized data segment, may be initialized by the OS kernel to zero before a program starts executing; the zeroing may be performed by the boot code. BSS segment 5 may comprise all global and static variables that are initialized to zero or that do not have explicit initialization in source code, BSS segment 5 may be readable and writable. BSS segment 5 may be allocated by lewder at run-time. Data segment 6, which is also referred to as initialized data segment, may contain the global and static variables that are initialized by the programmer. Data segment 6 may not be read-only, since the values of the variables may be altered at run-time. Data Segment 6 may store all global variables (with storage class specifier static or extern) and local static variables (defined inside a function) that may have defined initial values different than zero. Data segment 6's size may be determined by a size of the variables, and its size may be known at compile time. Data segment 6 may be further classified into initialized read-only area and initialized read-write area (i.e., storing data that may be altered at run time).

Text segment 7, which is also referred to as code segment, may be the section memory that contains executable instructions of a program. Due to text segment 7's location relative to stack 3 and heap 4, overflows may be prevented from overwriting it. Text segment 7 may be shareable so that only a single copy needs to be in memory for frequently executed programs. Text segment 7 may, in some instances, be read-only and executable to prevent a program from accidentally modifying its instructions. Text segment 7 may store the executable program code (i.e., the machine-language instructions of the program) in the form of software blocks.

A software block may simply be a piece of a compiled binary (e.g., an executable binary image). A software block may be as small as a single function, or it may be an object file containing many functions, such as a library or even an entire program. As such, the disclosed software padding approach may be applied to entire programs comprising a plurality of blocks where each block is smaller than an entire program). Each software block may take up a fixed amount of memory in the target device.

The software block padding technique disclosed herein relates to an increasing of the size of a software block by adding a random amount of non-program space to its original or natural size. When a padded software block gets loaded into the target device's memory, all the software blocks that get loaded after the padded block may now be at a different location because the padded block occupies more space than the unpadded block would have occupied. If the padding occurs at the beginning of the software block, then the padding will shift the locations of all the software instructions in the block. Thus, even if the software block is the entire program, by putting a random padding at the beginning of the block, the locations of all the instructions in the program will have changed. For example, if the "main" executable portion of a program is normally loaded into memory address 0x0804800, by applying 0x1000 bytes (B) of padding at a beginning of the text segment, it will now begin executing at address 0x08049000. As such, all addresses after this will also be offset by 0x1000. Similarly, two instance of compiled binary using different block padding will have instructions in different places in memory even though the instructions are the same in each compiled binary.

Figure 2:
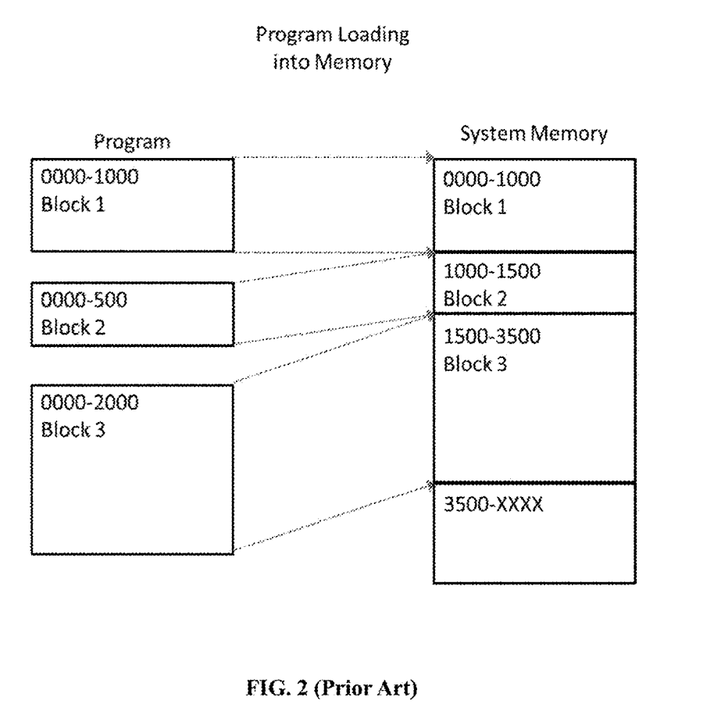
FIG. 2 illustrates loading of software program blocks into system memory, as is known in, the art.

FIG. 2 illustrates conventional loading of software program blocks into system memory A data storage block, sometimes called a physical record, may be a structured sequence of bytes or bits, and it may comprise a whole number of records and have a maximum length (a block size). Blocked data may be read or written a whole block at a time. As depicted in FIG. 2, binary images of program code may be stored sequentially in system (main) memory. For example, block 1 having 1000 bytes (B) may be loaded by a loader from a non-volatile RAM (NVRAM) to a first address to store the 1000 B, block 2 having 500 B may be loaded by the loader from the NVRAM to a second address to store the 500 B of block 2 after the 1000 B of block 1, and block 3 having 2000 B may be loaded by the loader from the NVRAM to a third address to store the 2000 B of block 3 after the 500 B of block 2. In this example, the starting address at which block 1 is stored may be any address n (e.g., in Text portion 7 of FIG. 1) and the starting addresses at which blocks 2 and 3 are stored may be addresses n+0x1000 B and address n+0x1500 B, respectively, as is shown in FIG. 2. Address in FIG. 2 is shown to be 0x0000, but this may be, in some implementations, a relative address within the system memory. For example, address n may actually be 0x08048000.

Figure 3:
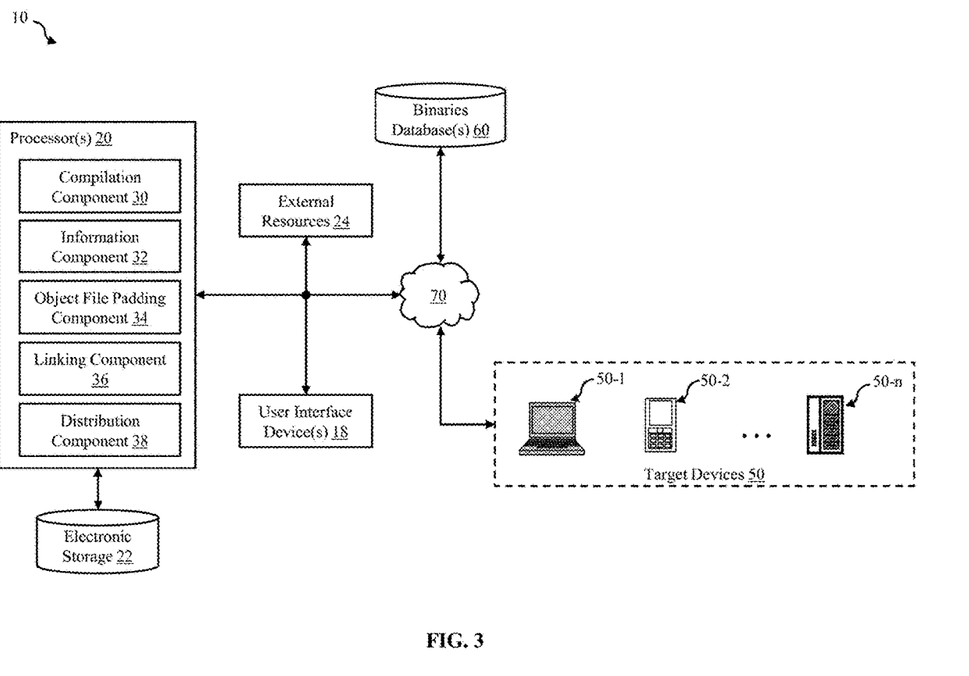
FIG. 3 schematically illustrates a system configured for static software diversification, in accordance with one or more embodiments.
Figure 4:
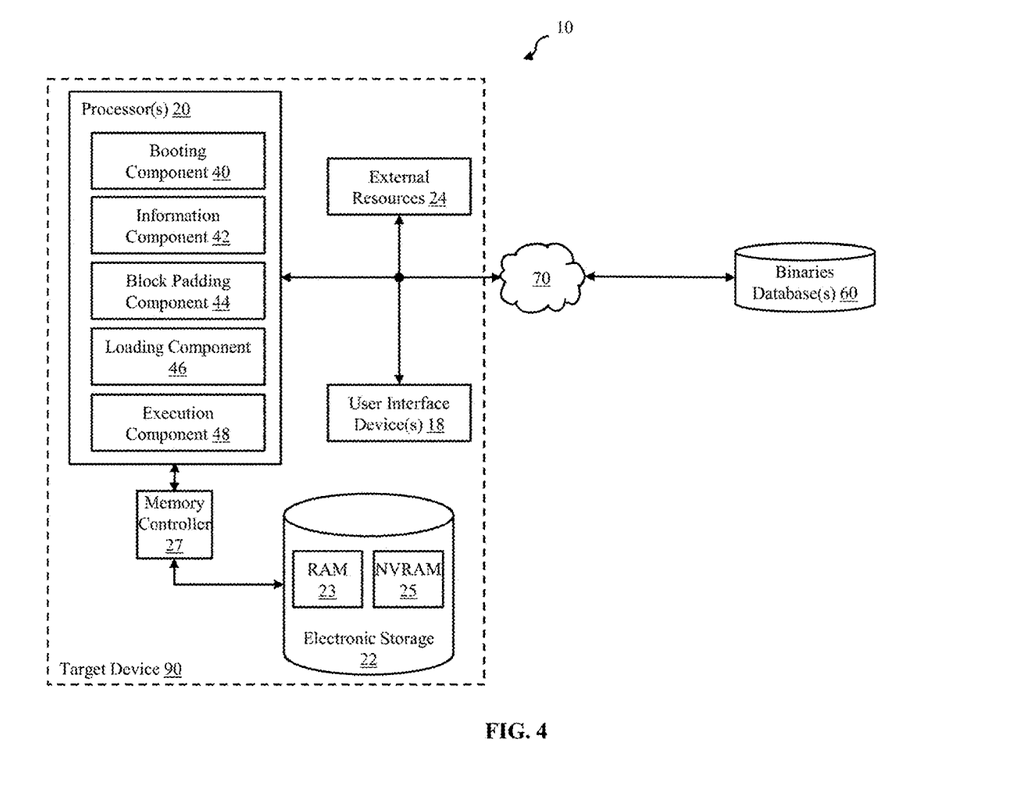
FIG. 4 schematically illustrates a system configured for dynamic software diversification, in accordance with one or more embodiments.

FIGS. 3 and 4 schematically illustrate, in accordance with at least some of the disclosed embodiments, systems configured for static software diversification and dynamic software diversification, respectively. For example, system 10 of FIG. 3 may perform, via at least processor 20, padding of one or more object files of a software program, source code of the software program being compiled into the one or more object files such that, after subsequent padding and linking, the resulting static binaries may be loaded at one or more target devices 50 for protecting these device(s) against at least deterministic memory addressing attacks. In another example, system 10 of FIG. 4 may dynamically perform, via at least processor 20, padding of one or more blocks of a software program such that, after subsequent loading, target device 90 is protected against at least a deterministic memory addressing attack on this program. With respect to the embodiments depicted in FIGS. 3-4, it is assumed herein that, even though processor(s) 20 may be the same (or different) hardware, they execute different instructions to implement the disclosed, different approaches to software diversification.

In some embodiments, system 10 of FIG. 3 may create a plurality of static, executable binaries that function the same because they may be based on the same source code. In some embodiments, system 10 of FIG. 4 may operate using a single, executable binary based on the same source code, but each time booting component 40 operates it may dynamically modify the single, executable binary to create a new executable binary that functions the same (i.e., as compared to functionality of the binary before the modification).

In some embodiments, each of target devices 50 is different from a first computing device (e.g., that includes processor 20 with respect to which the compilation data is compiled) and from a second computing device (e.g., that includes another instance of processor 20 with respect to which the one or more blocks are randomly padded). In other embodiments, at least one of target devices 50 is the same as a computing device on which the compilation data is compiled and on which the one or more blocks are randomly padded. Each of target devices 50 may be a device on which the compilation data of a software program is to be executed or actually executed.

In some embodiments, target device 90 is the same as a computing device on which compilation data is compiled and on which the one or more blocks are randomly padded. In other embodiments, target device 90 comprises a computing device that is different from the computing device on which compilation data is compiled. Target device 90 may be the device in which the one or more blocks are randomly padded before or during execution of the software program.

In some embodiments, target device 50 and/or target device 90 is a reduced capability device, such as an IoT device. In other embodiments, target device 50 and/or target device 90 is a server or another type of computer.

As is known in the art, compilers compile software source code. More specifically, they read, analyze, and translate source code (e.g., .c, .cc, .cpp, or a file type of any suitable programming language) into one or more object files or a list of error messages. Still more specifically, compilers may output an assembly language program, and then an assembler may assemble the assembly language program into one or more object files (e.g., machine language module(s)), Compilers may create one object file per each source code file. The compiler may be, e.g., a high level programming language compiler (e.g., a C++ compiler) or a microprocessor chip level, assembler (e.g., an INTEL® x86 Assembler).

As is known in the art, linkers are computer utility programs that combine one or more object files (and possibly some library code) into either an executable, another object file, a library, or a list of error messages. Binary executables are thus produced as output from a linker, Binary executables, in some use cases, may have no special suffix (e.g., as is the ease on Unix OSs); in other use cases, they may end in ".exe" (e.g., as is the case on Windows OSs). Linking, for generating the executable, may be done at compile time, at load time (by loaders), or at run time (by application programs).

In some embodiments, the disclosed linker is native to processor 20. In some embodiments, linking component 36 may comprise some functionality conventionally provided by a standard linker or a linker offered by third party software. With reference to FIG. 3, linking component 36 may operate agnostic to the underlying operating, system (OS). That is, one or more features of the disclosed software padding may be performed in a linker or another component of processor 20, without requiring the program to implement a particular OS.

As is known in the art, a loader may be part of the OS, and it may be responsible for loading programs and libraries for starting a program by reading the executable into memory. Loaders may prepare the executable for running. Loaders may also perform some address translation and run the software program, resulting in a running program or an error message (or both). Program loading may therefore refer to a copying, of executable instructions from NVRAM (e.g., a hard disk or flash) into RAM (e.g., a main memory) to put the program into a ready-to-run state. In some cases, program loading involves allocating storage space or mapping virtual addresses to disk pages. Once loading is complete, the OS may start the program by passing control to the loaded program code. In some implementations, the loader is permanently resident in memory.

In some embodiments, the static (object file) and dynamic (block) software padding approaches disclosed herein may be used with target devices that do not have an OS.

In some embodiments, compilation data is a binary (i.e., executable software code). In these or other embodiments, compilation data is am object file. Herein, the terms binary, compiled binary, binary image, image, compiled binary image, executable, compilation data, etc. are used interchangeably herein without significant variation in meaning. Similarly, program, process, code, application (app), software, firmware, etc. may be used interchangeably herein.

FIGS. 3-4 share some reference numerals to demonstrate same or similar functionality be different embodiments. For example, with respect to FIG. 3, binaries database 60 may be used to store recently compiled and linked binaries for future execution, but, with respect to FIG. 4, binaries database 60 may be used to obtain previously compiled and linked binaries for impending execution. In some embodiments, the functionality and/or content of each of elements corresponding to these shared numerals may be different in the disclosed static and dynamic approaches, as described in some detail below. For example, network 70 interconnecting devices, storage, static software padding processing, and other processing may be the same or different as network 70 with respect to which embodiments of dynamic software padding may be implemented.

Electronic storage 22 of FIG. 3 and/or FIG. 4 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface device 18, processor 20, etc.). In some embodiments, electronic storage 22 may be located in a computer together with processor 20, in a computer that is part of external resources 24, in user interface devices 18, and/or in other locations.

Electronic storage 22 may comprise one or more of optically readable storage media (e.g., optical disks, etc.) magnetically readable storage media (e.g., magnetic tape, magnetic hard drive, floppy drive, etc.), electrical charge-based storage media (e.g., erasable programmable read-only memory (EPROM), RAM, etc.) solid-state-storage media (e.g., flash drive, etc.), and/or other electronically readable storage media. Electronic storage 22 may include circuitry that allows information (e.g., computer-readable instructions and other data) to be stored and retrieved. Electronic storage 22 may store software algorithms, information obtained and/or determined by processor 20, information received via user interface devices 18 and/or other external computing systems, information received from external resources 24, and/or other information that enables system 10 to function as described herein.

Electronic storage 22 may include transitory memory (e.g., RAM) and non-transitory memory (e.g., NVRAM). For example, FIG. 4 depicts electronic storage 22 comprising RAM 23 and NVRAM 25. Access to RAM 23 and/or NVRAM 25 of electronic storage 22 may be controlled by memory controller 27. Memory controller 27 may provide an address translation function that translates between virtual and physical addresses, as instructions are executed.

External resources 24 may include sources of information (e.g., databases, websites, etc.), external entities participating with system 10, one or more computers outside of system 10, a network (e g., the Internet), electronic storage, equipment related to Wi-Fi technology, equipment related to Bluetooth® technology, data entry devices, and/or other resources. In some implementations, some or all, of the functionality attributed herein to external resources 24 may be provided by other resources included in system 10.

External resources 24, processor 20, user interface device 18, electronic storage 22, and/or other components of system 10 may be configured to communicate with each other via wired (e.g., Ethernet cabling, universal serial bus (USB), etc.) and/or wireless (e.g., cellular technology, Wi-Fi technology, Bluetooth® technology, near-field communication (NFC) technology, radio frequency (RF), etc.) connections, via a network (e.g., a network adapter for a local area network (LAN) and/or the Internet), and/or via other resources.

User interface device(s) 18 of system 10 may be configured to provide an interface between one or more users and system 10. User interface devices 18 are configured to provide information to and/or receive information from the one or more users. User interface devices 18 include a user interface and/or other components. The user interface may be and/or include a graphical user interface configured to present views and/or fields configured to receive entry and/or selection with respect to particular functionality of system 10, and/or provide and/or receive other information. In some embodiments, the user interface of user interface devices 18 may include a plurality of separate interfaces associated with processors 20 and/or other components of system 10. Examples of interface devices suitable for inclusion in user interface device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 18 include a removable storage interface. In this example, information may be loaded into user interface devices 18 from removable storage to g., a smart card, a flash drive, a removable disk) that enables users to customize die implementation of user interface devices 18.

In some embodiments, user interface devices 18 are configured to provide a user interface (UI), processing capabilities, databases, and/or electronic storage to system 10. As such, user interface devices 18 may include processors 20, electronic storage 22, external resources 24, and/or other components of system 10. In some embodiments, user interface devices 18 are connected to a network (e.g., the Internet). In some embodiments, user interface devices 18 do not include processor 20, electronic storage 22, external resources 24, and/or other components of system 10, but instead communicate with these components via dedicated lines, a bus (e.g., peripheral component interconnect (PCI) bus), a switch, network, or other communication means. The communication may be wireless or wired. In some embodiments, user interface devices 18 are laptops, desktop computers, smartphones, tablet computers, and/or other user interface devices.

Data and content may be exchanged between the various system 10 components through a communication interface and communication paths using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used, Examples of an Internet protocol include Internet Protocol Version 4 (IPv4) and Internet Protocol Version 6 (IPv6).

In some embodiments, processor 20 may belong to a networked computing device, a user device, a consumer electronics device, a mobile phone, a smartphone, a personal data assistant, a digital tablet/pad computer, a wearable device, a personal computer, a laptop computer, a notebook computer, a work station, a server, a vehicle computer, a game or entertainment system, a set-top-box or any other device. As such, processor 20 is configured to provide information processing capabilities in system 10, Processor 20 may comprise one or more of a digital processor, an analog processor, a digital circuit designed to process information, an analog circuit designed to process information, a state machine, and/or other mechanisms for electronically processing information, Although processor 20 is shown in each of FIGS. 3-4 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, user interface devices 18, devices that are part of external resources 24, electronic storage 22, and/or other devices).

As shown in FIG. 3, processor 20 is configured via machine-readable instructions to execute one or more computer program components. The computer program components may comprise, one or more of compilation component 30, information component 32, object file padding component 34, linking component 36, distribution component 38, and/or other components. Processor 20 may be configured execute components 30, 32, 34, 36, and/or 38 by: software; hardware; firmware; some combination of software, hardware, and/or firmware; and/or other mechanisms for configuring processing capabilities on processor 20.

It should be appreciated that although components 30, 32, 34, 36, and 38 are illustrated in FIG. 3 as being co-located within a single processing unit, in embodiments in which processor 20 comprises multiple processing units, one or more of components 30, 32, 34, 36, and/or 38 may be located remotely from the other components. The description of the functionality provided by the different components 30, 32, 34, 36, and/or 38 described below is for illustrative purposes, and is not intended to be limiting, as any of components 30, 32, 34, 36, and/or 38 may provide more or less functionality than is described. For example, one or more of components 30, 32, 34, 36, and/or 38 may be eliminated, and some or all of its functionality may be provided by other components 30, 32, 34, 36, and/or 38. As another example, processor 20 may be configured to execute one or more additional components that may perform some or all of the functionality attributed below to one of components 30, 32, 34, 36, and/or 38.

As shown in FIG. 4, processor 20 is configured via machine-readable instructions to execute one or more computer program components. The computer program components may comprise one or more of booting component 40, information component 42, block padding component 44, loading component 46, execution component 48, and/or other components. Processor 20 may be configured to execute components 40, 42, 44, 46, and/or 48 by: software; hardware; firmware; some combination of software, hardware, and/or firmware; and/or other mechanisms for configuring processing capabilities on processor 20.

It should be appreciated that although components 40, 42, 44, 46, and 48 are illustrated in FIG. 4 as being co-located within a single processing unit, in embodiments in which processor 20 comprises multiple processing units, one or more of components 40, 42, 44, 46, and/or 48 may be located remotely from the other components. The description of the functionality provided by the different components 40, 42, 44, 46, and/or 48 described below is for illustrative purposes, and is not intended to be limiting, as any of components 40, 42, 44, 46, and/or 48 may provide more or less functionality than is described. For example, one or more of components 40, 43, 44, 46, and/or 48 may be eliminated, and some or all of its functionality may be provided by other components 40, 42, 44, 46, and or 48. As another example, processor 20 may be configured to execute one or more additional components that may perform some or all of the functionality attributed below to one of components 40, 42, 44, 46, and/or 48.

Target device 50 of FIG. 3 and target device 90 of FIG. 4 may, in some implementations, be different devices, they may be similar, or they may be the same type of device, except that their respective processors 20 are configured to execute different software instructions. For example, target device 50 may be executing a program that calls for the loading of a pre-diversified executable, the executable being diversified by object file padding component 34 via one or more of the static software padding techniques disclosed herein; and target device 90 may be attempting to execute a program for which a loader pads an undiversified executable, this padding being performed by block padding component 44 via one or more of the dynamic software padding, techniques disclosed herein.

In some embodiments, compilation component 30 is configured to operate the same as or similar to a conventional compiler. In these or other embodiments, compilation code 30 may compile source code such that position-independent code is generated. As such, the code may be compiled by creating a jump table from one block to another block. Some embodiments may perform static padding by at least creating a compiled binary, e.g., by compiling source code that is position-independent. Some embodiments may create (e.g., assemble) many compiled binaries (e.g., for many target devices) with the herein disclosed random padding techniques relative to times (e.g., immediately after) the compiled object files are created and/or linked. In some embodiments, compilation component 30 is configured to facilitate creation of the compilation data.

In some embodiments, information component 32 is configured to obtain and identify object files from among the compilation data.

In some embodiments, object file padding component 34 is configured to perform software block padding via static padding of object files. That is, some embodiments may perform static padding by at least padding some of the object files. Even though each copy of the compiled binary may function identically, the addresses/locations of the instructions may be caused to be different within each compiled binary. When the different, compiled binaries are thus loaded onto different targets an attacker can no longer rely on an exploit (e.g. developed with respect to one of the compiled binaries) working on a target running a different compiled binary based on these "static" techniques.

In some embodiments, object file padding component 34 is configured to pad a beginning portion of the block. In other embodiments, object file padding component 34 is configured to pad a random portion of the block or to pad an ending portion of the block. Some embodiments of object file padding component 34 may randomize a size or amount of padding.

In some embodiments, object file padding component 34 is configured to pad each of the object files with a different plurality of bits. For example, a number of bits with which a beginning object file is padded may be different from a number of bits with which any intermediate object files are padded and from a number of bits with which an ending object file is padded. Each of these numbers may be generated by any suitable random number generator, and each of these numbers may be an integer. Similarly, values for each of the bits may be generated by any suitable random number generator, the each value being either a logic 1 or a logic 0. In some embodiments, object file padding component 34 is configured to pad bit(s) of each object file before or after the location of its executable instructions.

In some embodiments, object file padding component 34 is configured to diversify a compiled binary of a software through the disclosed software padding approach such that there is no resulting effect on performance or functionality of the underlying software. For example, the object files with respect to the compiled binary are only moved, but the instructions and data of the program may not be modified. The total size of the program memory may be increased by a sum of the sizes of all of the padding. In some implementations, object file padding component 34 may cause a size increase that is a negligible amount. In other implementations of the disclosed padding, the size increase, per padded object file may be hundreds or thousands of bits or bytes.

In some embodiments, linking component 36 may perform the same or similar operations of a conventional computing linker, except that this linking component is contemplated to be modified based on the disclosed approach, i.e., to handle padded object files. For example, linking component 36 may be configured to link padded object files to create executable binaries. Linking component 36 may combine a set of object files into a single binary and repeat these operations one or more other times. Further, since the padding of the object, files that link to create the binary is done at link time, any address references reflect the rearrangement.

Some embodiments may perform static padding by at least, linking object files according to the techniques disclosed herein.

In some embodiments, linking component 36 is configured to perform relocation (i.e., to relocate objects using position-independent code) at link time. In some embodiments, position-independent code (or position-independent executable) may comprise machine code that, being placed somewhere in main memory, executes properly regardless of its absolute address. One compiled and linked, the blocks of compilation data may subsequently be loaded into memory at text segment 7, as is demonstrable with respect to FIG. 1.

In some embodiments, distribution component 38 is configured to release the statically diversified executable to one or more target devices 50. As such, each of these distinct, diversified releases may be provided to a different subset of end users, preventing the need for wide distribution of a single release of the binary file. In some embodiments, distribution component 38 is configured to distribute the padded binaries via network 70 and/or binaries database 60 to target devices 50. In some embodiments, distribution component 38 is configured to transmit one or more executable binaries to each target device 50-1, 50-2, . . . 50-n.

In some embodiments, booting component 40 (or information component 42) is configured to obtain, at target device 90, compiled binaries via network 70, binaries database 60, and/or electronic storage 22. In some embodiments, booting component 40 is configured to access the compiled binaries using a network adapter and/or memory controller 27. For example, booting component 40 may be configured to write the compiled binaries to and/or read the compiled binaries from electronic storage 22, which may itself comprise a plurality of different memories (e.g., RAM 23 and/or NVRAM 25). More particularly, booting component 40 may be configured to read the compiled binaries from NV-RAM 25.

In some embodiments, information component 42 is configured to obtain and identify blocks from among a compiled binary read from a memory.

In some embodiments, block padding component 44 is configured to perform software block padding via dynamic padding of blocks of executable code. That is, some embodiments may pad the blocks identified from among the compilation data.

In some embodiments, block padding component 44 may not necessarily create a plurality of different compiled binaries. Instead, when each software block of a program is loaded (e.g., from NVRAM) into memory (e.g., RAM or cache memory), some embodiments of block padding component 44 may add random padding to the each software block. Thus, every time a target is booted or each time the compiled binary is loaded for execution, the instructions in the compiled binary will dynamically be in different locations. For example, even though there may only be one such compiled binary used on every target, the software instructions would not be found in the same locations on different targets or even on the same target, if the target reboots or reloads the software. The dynamic software block padding performed by block padding, component 44 may require (i) the software blocks of the program to be created in a certain way that supports the executable code being loaded at a location not specified, when the compiled binary is created, and (ii) the loading software (loader) used on the target to be modified to perform the dynamic padding.

In some embodiments, block padding component 44 is configured to operate the same as or similar to object file padding component 34. But instead of padding object files, padding component 44 pads blocks, the manner of padding being otherwise the same. And instead of object file padding component 34 padding object files at linking time with respect to a linker, block padding component 44 may pad blocks at loading time with respect to a loader.

In some embodiments, block padding component 44 is configured to diversify a compiled binary of a software through the disclosed software block padding approach such that there is no resulting effect on performance or functionality of the underlying software. For example, the software blocks with respect to the compiled binary are only moved, but the instructions and data of the program are not modified. The total size of the program memory may be increased by a sum of the sizes of all of the padding. In some implementations, block padding component 44 may cause a size increase that is a negligible amount. In other implementations of the disclosed padding, the size increase may be, hundreds or thousands of bits or bytes per padded block.

As mentioned, the padding of blocks may be implemented the same as or similar to the padding of object files. For example, block padding component 44 may be configured to pad each of the blocks with a different plurality of bits and to pad bit(s) of each block before the location of its executable instructions.

In some embodiments, at least on of block padding, component 44 and loading component 46 is configured to be at least a new loader, modify an existing loader, operate with respect to a modified loader, and/or operate as at least a modified loader. As such, the disclosed padding of blocks at load time may be performed irrespective of a particular OS (e.g., without requiring the program to implement the OS). In some embodiments, block padding component 44 and/or loading component 46 may dynamically add padding while still keeping intact address references in the executable code. In some embodiments, loading component 46 may comprise some functionality conventionally provided by a standard loader or a loader offered by the OS or any third party software. With reference to FIG. 4, loading component 46 may operate agnostic to the underlying OS.

In some embodiments, loading component 46 may perform the same or similar operations of a typical loader for the underlying OS. In these or other embodiments, the loader may be modified based on the disclosed approach, i.e., to handle padded blocks. In some embodiments, loading component 46 is configured to perform relocation (i.e., to relocate objects using position-independent code) at load time (or at run time by the running program itself). In some embodiments, loading component 46 is configured to load the padded blocks such that they are loaded into memory at text segment 7, as is demonstrable with respect to FIG. 1.

In some embodiments, loading component 46 is configured to write the padded blocks to and/or read the padded blocks from electronic storage 22. More particularly, loading component 46 may be configured to write the padded blocks to RAM 23.

In some embodiments, execution; component 48 is configured to execute instructions from RAM 23 at their relocated locations, i.e., within the padded memory blocks. In some embodiments, execution component 48 is configured to execute instructions of a compiled binary (e.g., obtained from RAM).

Figure 5:
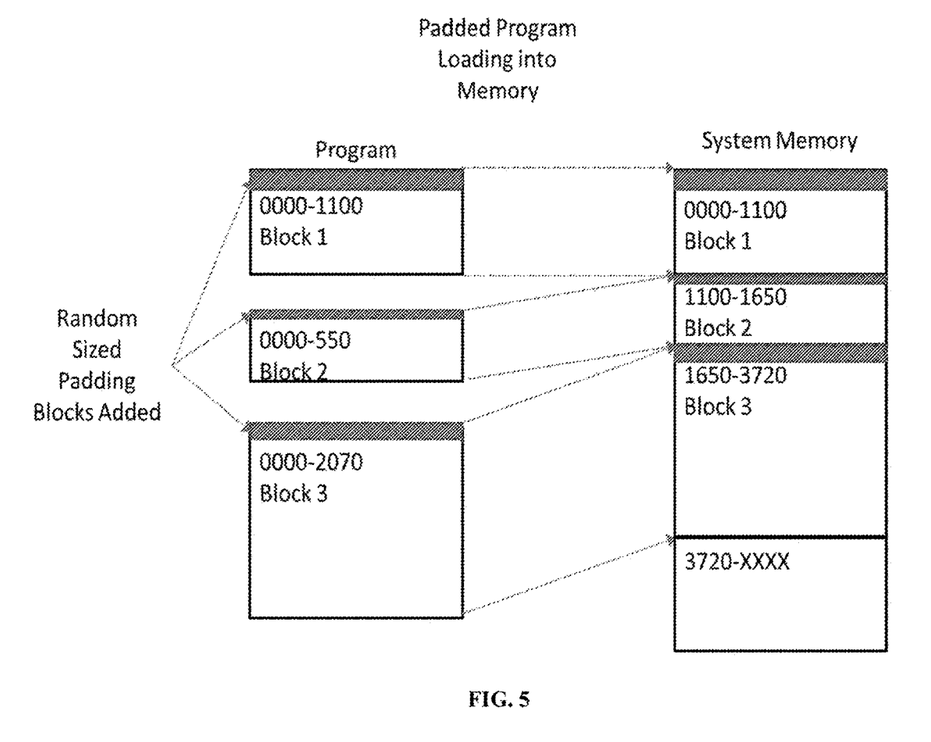
FIG. 5 illustrates loading of padded software program blocks into system memory, in accordance with one or more embodiments.

FIG. 5 illustrates loading of padded software program blocks into system memory, in accordance with, one or more embodiments. The disclosed approach implements software diversification via software block padding. As depicted in FIG. 5, padded binary images of program code may be stored sequentially in system (main) memory. For example: block 1 having 1100 B (e.g., 1000 B of real/actual data and 100 B of junk data) may be loaded by a loader to a first address to store the 1100 B block 2 having 550 B (e.g., 500 B of real data and 50 B of junk data) may be loaded by the loader to a second address to store the 550 B of block 2 after the 1100 B of block 1; and block 3 having 2070 B (e.g., 2000 B of real data and 70 B of junk data) may be loaded by the loader to a third address to store the 2070 B of block 3 after the 550 B of block 2. In this example, the starting address at which block 1 is stored may be any address n in Text portion 7 of FIG. 1); and the starting addresses at which blocks 2 and 3 are stored may be addresses n+0x1100 B and address n+0x1650 B, respectively, as is shown in FIG. 5. Address a in FIG. 5 is shown to be 0x0000, but this may be, in some implementations, a relative address within the system memory. For example, address n may actually be 0x08048000.

Although FIG. 5 depicts blocks receiving padding, this is, not intended to be limiting. That is, FIG. 5 may also be interpreted such that the blocks of a software app are replaced with object files of the software app, the padding of this alternative interpretation being added to the object files as opposed to the blocks. Then, after being linked, the resulting compilation data may be loaded into system memory, with the instructions being shifted due to the added padding, as depicted in FIG. 5.

FIG. 5 illustrates that some embodiments support use cases where software blocks of a program are smaller than the entire compiled binary. In these cases, the disclosed approach is to pad software blocks (or object files) such that different instructions within the compiled binary will have moved by differing amounts. For example, block padding component 44 (and object file padding, component 34) may pad bits such that a starting address/location of an entire compiled binary in memory is randomized. In this example or in another example, block padding component 44 (and object file padding component 34) may pad bits such that one or more non-starting (e.g., relative) addresses/locations of executable instructions within the memory are randomized. As, such, an attacker knowing where the compiled binary starts in the memory of the target will not be enough to allow the attacker to successfully modify an exploit.

FIG. 5 further illustrates that blocks are padded by adjusting size(s) of blocks (or object files). By this approach, some embodiments may create software diversity, such that entropic uncertainty is introduced in the target computing device.

In the example of FIG. 5, the program is comprised of three blocks of executable code (or three object files, when interpreted as such pre-linking). But it will be appreciated by one of ordinary skill in the art that a program may be comprised of a large number of object files and/or a large number of blocks.

The padding may be strategically determined to be at a beginning portion of the block (as shown in FIG. 5), in a random location within the block, or at an ending portion of the block. In some embodiments, all blocks may be padded at a same relative location. Other embodiments may strategically pad: none, one, or a plurality of blocks of a program at a beginning portion; none, one, or a plurality of blocks of the program at a random portion; and/or none, one, or a plurality of blocks of the program at an ending portion. In other words, any combination of strategic padding is contemplated by this disclosure. In some embodiments, the padding (bits) comprises a series of zeros (0), a series of ones (1), or any combination (e.g., based on a random number) of zeros and ones. In some embodiments, the padding of each object file or the padding of each block may result in a unique padding (i.e., unique content of the padding and/or unique size of the padding). In some embodiments, the padding amount is the same for every block of a program. In other embodiments, each block of the program may be padded by a different amount of bits, as is shown in FIG. 5. That is, in this example, as compared to the example of FIG. 2, block 1 is padded 100 B, block 2 is padded 50 B, and block 3 is padded 70 B. In some embodiments, the disclosed padding may be of a minimum and/or maximum size (e.g., anywhere between 5 B and 5000 B). In the example of FIG. 5, as a result of the padding, block 2 may now begin at relative address location 0x1100, and block 3 may now begin at relative address location 0x1650.

Some embodiments of object file padding component 34 and/or block padding component 44 may increase the entropy of software binary address space by ins ring random padding into executable of files and/or software blocks. Entropy herein refers to a measure of unpredictability, and it may be measured in bits. The disclosed approach is therefore a mechanism for statically (at compile and/or link time) or dynamically (at load and/or run time) inserting randomly sized pads, e.g., filler bits, to offset memory addresses for instructions and data (e.g., pre-initialized data).

Figure 6:
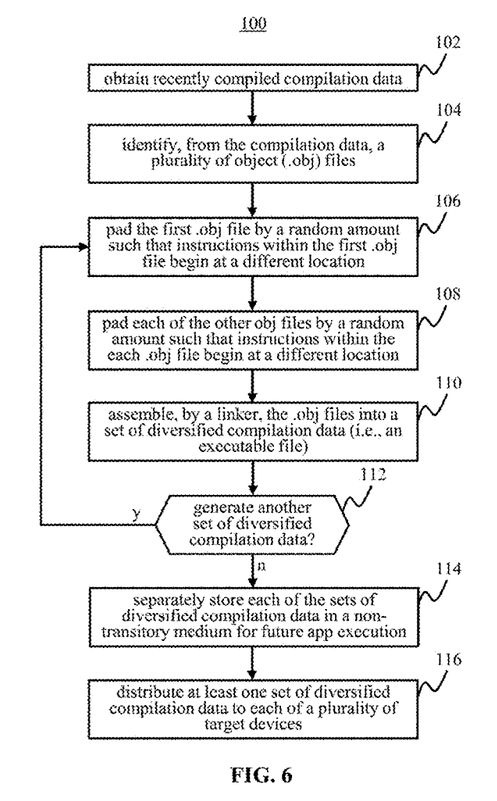
FIG. 6 illustrates a method for statically applying padding to software object flies, in accordance with one or more embodiments.

FIG. 6 illustrates method 100 for statically applying padding to program object files, in accordance with one or more embodiments. Method 100 may be performed with a computer system comprising one or more computer processors and/or other components. The processors are configured by machine readable instructions to execute computer program components. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 6 and described below is not intended to be limiting. In some embodiments, method 100 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 100 in response to instructions stored electronically on an electronic storage medium. The processing devices may include one or more devices configured through hardware, firmware, and/or software to be specifically designed for execution of one or more of the operations of method 100.

At operation 102 of method 100, recently compiled compilation data may be obtained. As an example, source code may be compiled into position-independent code to generate the compilation data. The compilation data may then be stored in electronic storage 22 and/or in binaries database 60 (or distributed to target device 50 without any, padding), as is demonstrable in FIG. 3. In that or other examples, the compilation data are read from a memory, via a bus, or by extraction. In these or other examples, the compilation data are obtained as direct byproducts of (i.e., automatically responsive to) a compiler. In some embodiments, operation 102 is performed by a processor component the same as or similar to compilation component 30 (shown in FIG. 3 and described herein).

At operation 104 of method 100, a plurality of object (.obj) files may be identified from among the compilation data. As an example, one of the .obj files may begin the compilation data, i.e., be a very first object file from among a plurality of .obj files that comprise a software program. In this example, the plurality of .obj files consists of the one .obj file and one or more other .obj files that are intermediate or ending .obj files of the software program. In some embodiments, operation 104 is performed by a processor component the same as or similar to information component 32 (shown in FIG. 3 and described herein).

At operation 106 of method 100, the very first .obj file may be padded by a random amount such that instructions within the first .obj file begin at a different location. As exemplary padding, an initial portion of the first .obj file may comprise a random amount of junk data (e.g., zeros, random bits, etc.). In some embodiments, operation 106 is performed by a processor component the same as or similar to object file padding component 34 and/or linking component 36 (shown in FIG. 3 and described herein).

At operation 108 of method 100, each of the other .obj flies may be padded by a random amount such that instructions within the each obj. file begin at a different location. As exemplary padding, an initial portion of one or more of the other .obj files may comprise a random amount of junk data (e.g., zeros, random bits, etc.). In some embodiments, operation 10$ is performed by a processor component the same as or similar to object file padding component 34 and/or linking component 36 (shown in FIG. 3 and described herein).

At operation 110 of method 100, the .obj files may be assembled by a linker (or another utility) into a set of diversified compilation data (i.e., an executable file), the set of diversified compilation data being an executable, binary image. In some embodiments, operation 110 is performed by a processor component the same as or similar to linking component 36 (shown, in FIG. 3 and described herein).

At operation 112 of method 100, a determination is made as to whether to generate another set of diversified compilation data. As such, the padding (and assembling) operations 106, 108, 110, and 112 may all be repeated a plurality of times to generate each time a set of diversified compilation data an entire compiled binary). As a result of this diversification, each of the sets of diversified compilation data may be separately stored in a medium (e g., non transitory computer-readable medium) tar future execution of the executable instructions of a program. As an example, an assembler may assemble a first binary, but a security policy may dictate that a total of thirty binaries are to be created. Accordingly, a first (initial) time operation 112 is reached, the first binary may be created or generated. Operations 106-112 may then be repeated, in this example, thirty times, i.e., due to operation 112 resulting in a yes (y). And not until a thirtieth iteration of operations 106-112, in this use case of method 100, would operation 112 result in a no (n). In some embodiments, operation 112 is performed by a processor component the same as or similar to information component 32, object file padding component 34, or linking component 36 (shown in FIG. 3 and described herein).

At operation 114 of method 100, each of the sets of diversified compilation data may be separately stored in a non-transitory medium for future app execution. As an example, the diversified compilation data may be desired for use immediately and thus loaded in main memory (or remain there alter the padding and assembling). In other examples more relevant to operation 114 of FIG. 6, the diversified compilation data may be desired for use at a later time (e.g., by the same device or, more likely, a different device) so it may be stored in any format or type of storage (e.g., binaries database 60). In some embodiments, operation 114 is performed by a processor component the same as or similar to linking component 36 (shown in FIG. 3 and described herein).

At operation 116 of method 100, at least one Set of diversified compilation data may be distributed to each of a plurality of target devices. For example, an electronic copy of the diversified release (e.g., a set of diversified compilation data) may be downloaded at target device 50. That is, from storage (e.g., directly from binaries database 60 or indirectly by first copying it onto the target device or storage medium), at the later time, a distributed-to device may load the diversified compilation data into main memory for execution. In some embodiments, operation 116 is performed by a processor component the same as or similar to distribution component 38 (shown in FIG. 3 and described herein).

Figure 7:
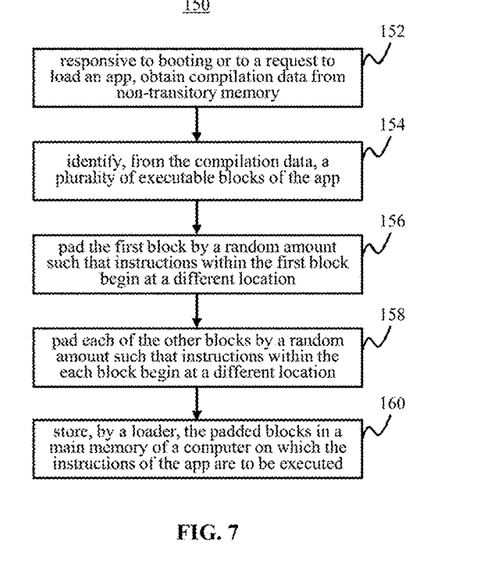
FIG. 7 illustrates a method for dynamically applying padding to software blocks during program loading, in accordance with one or more embodiments.

FIG. 7 illustrates method 150 for dynamically applying padding to program blocks during software loading, in accordance with one or more embodiments. Method 150 may be performed with a computer system comprising one or more computer processors and/or other components. The processors are configured by machine readable instructions to execute computer program components. The operations of method 150 presented below are intended to be illustrative. In some embodiments, method 150 may be accomplished with one or more additional operations not described, and/or without one or more of the operations discussed. Additionally, the order in which the operations of method 150 are illustrated in FIG. 7 and described below is not intended to be limiting. In some embodiments, method 150 may be implemented in one or more processing devices (e.g., a digital processor, an analog processor, a digital circuit designed to process information, an analog circuit designed to process information, a state machine, and or other mechanisms for electronically processing information). The processing devices may include one or more devices executing some or all of the operations of method 150 in response to instructions stored electronically on an electronic storage medium. The processing devices may include one or more devices configured through hardware, firmware, and/or software to be specifically designed for execution of one or more of the operations of method 150.

At operation 152 of method 150, responsive to booting, or to a request to load an app, compilation data may be obtained. As an example, the compilation data are read from a memory (e.g., non-transitory memory), via a bus, or by extraction. In an example, the compilation data is accessed by a boot loader or a program loader. In some embodiments, operation 152 is performed by a processor component the same as or similar to hooting component 40 (shown in FIG. 4 and described herein).

At operation 154 of method 150, a plurality of executable blocks of the app may be identified from among the compilation data. As an example, one of the blocks may begin the compilation data, i.e., be a very first block from among a plurality of blocks that comprise a software program. In this example, the plurality of blocks consists of the one block and one or more other blocks that are intermediate or ending blocks of the software program. In some embodiments, operation 154 is performed by a processor component the same as or similar to information component 42 (shown in FIG. 4 and described herein).

At operation 156 of method 150, the first block may be padded by a random amount such that instructions within the first block begin at a different location. As exemplary padding, an initial portion of the first block may comprise a random amount of junk data (e.g., zeros, random bits, etc.). In some embodiments, operation 156 is performed by a processor component the same as or similar to block padding component 44 and/or loading component 46 (shown in FIG. 4 and described herein).

At operation 160 of method 150, each of the other blocks may be padded by a random amount such that instructions within the each block begin at a different location. As exemplary padding, an initial portion of one or more of the other blocks may comprise a random amount of junk data (e.g., zeros, random bits, etc.). In some embodiments, operation 158 is performed by a processor component the same as or similar to block padding component 44 and nor loading component 46 (shown in FIG. 4 and described herein).

At operation 160 of method 150, the padded blocks may be stored by a loader in a main (e.g., system, transitory, etc.) memory of a computer on which the instructions of the app are to be executed. For example, instructions of the app within the dynamically padded blocks may be loaded into cache or other RAM and then executed. In some embodiments, operation 160 is performed by a processor component the same as or similar to loading component 46 and/or execution component 48 (shown in NG, 4 and described herein).

In some embodiments, the disclosed static approach (e.g., with respect to FIGS. 3 and 5-6) may be combined with the disclosed dynamic approach (e.g., with respect to FIGS. 4-5 and 7). For example, a computing device may (i) compile position-independent code and (ii) link statically padded object files to generate one or more sets of diversified compilation data; then, (iii) at run-time (e.g., when the diversified compilation data is to be executed as a software program), the stone device or another computing device may further diversify one of the generated sets of compilation data by dynamically padding its blocks. In this example, one or More executable instructions may move (due to the padding) to randomly determined locations twice, for even mote robust protection against possible attacks.

ASLR randomizes the location of the entire compiled binary in memory, while the disclosed software block padding randomizes the location of instructions within the compiled binary. Similarly, in some embodiments, at least one of ASLR and object file reordering may be combined with the disclosed padding approach to increase the degree of software diversification of a compiled binary. Accordingly, some embodiments may perform any combination of static padding, dynamic padding, ASLR, and object the reordering. As disclosed in U.S. Pat. No. 10,089,494, object file reordering may be performed by randomizing a linking order of object files and then by linking the randomly ordered object files. This randomizing may be prior to, during, or after the disclosed object file padding techniques.

Since the disclosed approach does not require OS support, it may be beneficial to internet of things (IoT) devices, which may have little or no protection for programs loaded in its main memory. Such less advanced OSs, which may not already implement ASLR, may thus be enhanced with at least one form of software diversification, these IT devices may thus be secured against code reuse attacks that depend on known code instruction address space layout.

In some embodiments, devices implementing the disclosed approach may be monitored. For example, the monitoring may include monitoring devices that obtain access to a network (e.g., company intranet, network 70 of FIG. 3 or 4, etc.). This, exemplary monitoring may further comprise determining that one of the monitored devices obtained access to the network without providing valid credentials. Such noncompliant device may be an attacker, but in some contemplated use cases the device or system performing the monitoring may not be able to detect attackers gaining access to the network. Continuing with this example, the monitoring device may be configured to confirm that the one device is unable to identify or alter any object files or any blocks of a software program to be run for being run). This confirmation of a thwarted attack may be based on a padding of each of a plurality of object files and/or of blocks of a software program by a random amount such that executable instructions within the each object file or block begin at a different location.

Figure 8:
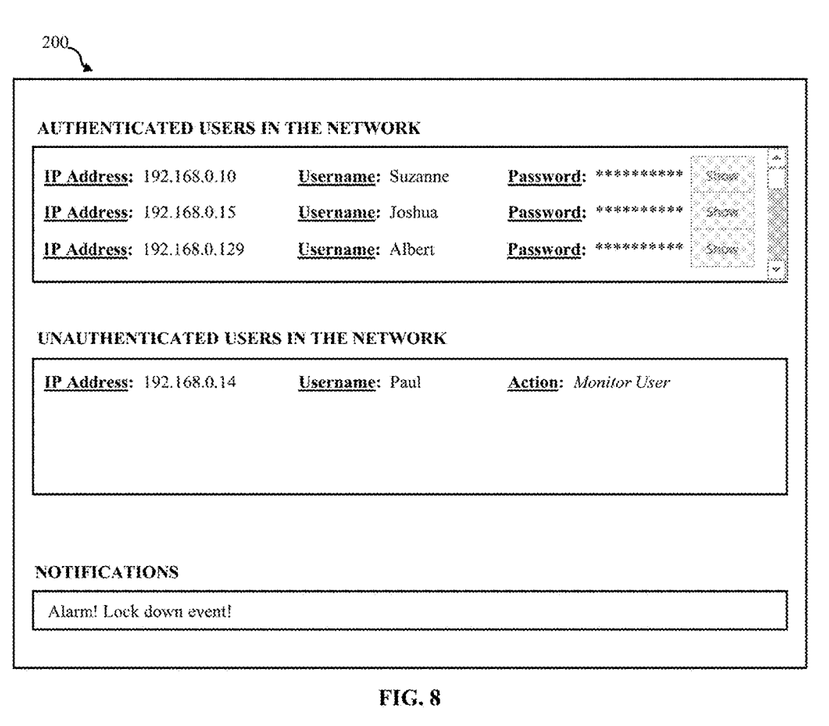
FIG. 8 illustrates a user interface for monitoring the software of networked users, in accordance with one or more embodiments.

FIG. 8 illustrates a user interface (UI) 200 for monitoring the software of networked users, in accordance with one or more embodiments. This depicted UI may operate with respect to user interface device 18 of FIG. 3. UI 200 may include a first box listing valid credentials of plural devices in the network, a second box beneath the first box listing potential attacking users (e.g., a device with invalid credentials or that performs another anomaly that may require further monitoring), and a third box beneath the second box representing an alarm prompt to notify a network administrator (e.g., internal information technology (IT) department personnel, a third party, etc.) and/or cause a "lock-down" of secure information in the network, which could be compromised. The third box of UI 200 may further notify whether an attack has taken place (e.g., no attack, an attack has taken place, an attack is in progress, or other security notification) based on activity of a device (e.g., device with IP address 192.168.0.14).

Techniques described herein can be implemented in digital electronic circuitry, or in computer hardware, firmware, software, or in combinations of them. The techniques can be implemented as a computer program product, i.e., a computer program tangibly, embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable, for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method for diversifying software implemented with respect to at least a computing device, comprising:
   obtaining, via one or more processors, compilation data;
   identifying, via one or more processors, a plurality of blocks from the compilation data;
   padding, via one or more processors to generate padded data, each of one or more blocks of the plurality of blocks by a random amount such that executable instructions within the each block begin at a different location to prevent a deterministic memory addressing attack;
   repeating the padding to generate other padded data, the other padded data being different than the padded data;
   providing the padded data to a target device; and
   providing the other padded data to another target device, wherein the one or more blocks is arranged after a beginning block of the compilation data.

2. The method of claim 1, further comprising:
   padding another block of the plurality of blocks by a random amount such that other executable instructions within the other block begin at a different location, the other block of the plurality of blocks being the beginning block of the compilation data.

3. The method of claim 2, further comprising:
   separately storing the padded data and the other padded data in a non-transitory medium for future execution of the executable instructions of a program or application.

4. The method of claim 3,
   wherein each of the target devices is different from a first computing device on which the compilation data is compiled and from a second computing device on which the one or more blocks are randomly padded.

5. The method of claim 3,
   wherein at least one of the target devices is the same as a computing device on which the compilation data is compiled and on which the one or more blocks are randomly padded.

6. The method of claim 1, further comprising:
   compiling source code to generate the compilation data,
   wherein the compilation data is obtained responsive to the compilation of the source code, and
   wherein the one or more blocks are padded by a linker of an operating system.

7. The method of claim 1, wherein the compilation data is obtained from non-transitory memory responsive to beginning a boot cycle or to beginning a software loading process, and
   wherein the one or more blocks are padded by a loader of an operating system.

8. The method of claim 7, further comprising:
   storing the padded blocks in a transitory memory of a computing device on which the executable instructions of a program or application are to be executed.

9. The method of claim 7, wherein the compilation data is obtained from a same computing device on which the compilation data is compiled and on which the one or more blocks are randomly padded.

10. The method of claim 7, wherein the compilation data is obtained and the one or more blocks are randomly padded on a computing device that is different from a computing device on which the compilation data is compiled.

11. The method of claim 2, wherein the padding of the other block by the random amount is performed by adding a first plurality of bits before the other executable instructions.

12. The method of claim 11, further comprising:
   randomly determining a value for each of the first plurality of bits.

13. The method of claim 11, wherein the padding of the one or more blocks by the random amount is performed by adding a second plurality of bits before the executable instructions of each of the one or more blocks, the second plurality being different from the first plurality.

14. The method of claim 2, further comprising:
   randomizing, via address space layout randomization (ASLR), a starting address for the other block of the plurality of blocks.

15. The method of claim 1, further comprising:
   prior to the padding, randomizing a linking order of object files; and
   linking the randomly ordered object files to generate the plurality of blocks.

16. The method of claim 1, further comprising:
   compiling source code into position-independent code to generate the compilation data.

17. An apparatus, comprising:
a non-transitory memory including instructions stored thereon for securing a networked system; and
one or more processors operably coupled to the non-transitory memory, the one or more processors being configured to execute the instructions of:
  identifying a plurality of blocks from compilation data;
  padding, to generate padded data, each of one or more blocks of the plurality of blocks by a random amount such that executable instructions within the each block begin at a different location to prevent a deterministic memory addressing attack;
  repeating the padding to generate other padded data, the other padded data being different than the padded data;
  providing the padded data to a target device; and
  providing the other padded data to another target device,
  wherein the one or more blocks is arranged after a beginning block of the compilation data.

18. The apparatus of claim 17, wherein the one or more processors are further configured to execute the instructions of:
  padding another block of the plurality of blocks by a random amount such that other executable instructions within the other block begin at a different location, the other block of the plurality of blocks being the beginning block of the compilation data;
and
  separately storing the padded data and the other padded data in a non-transitory medium for future execution of the executable instructions of a program or application.

19. The apparatus of claim 17, wherein the compilation data is obtained from non-transitory memory responsive to beginning a boot cycle or to beginning a software loading process,
  wherein the one or more blocks are padded by a loader of an operating system, and
  wherein the one or more processors are further configured to execute the instructions of:
    storing the padded blocks in a transitory memory of a computing device on which the executable instructions of a program or application are to be executed.

* * * * *